United States Patent
Jia et al.

(10) Patent No.: US 10,298,138 B2
(45) Date of Patent: May 21, 2019

(54) PROGRAMMABLE POWER ADAPTER

(71) Applicant: Google LLC, Mountain View, CA (US)

(72) Inventors: Liang Jia, Palo Alto, CA (US);
Honggang Sheng, Milpitas, CA (US);
Srikanth Lakshmikanthan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/693,393

(22) Filed: Aug. 31, 2017

(65) Prior Publication Data

US 2019/0068069 A1 Feb. 28, 2019

(51) Int. Cl.
*H02M 3/335* (2006.01)
*H02M 1/44* (2007.01)
*H02M 1/00* (2006.01)
*H02M 1/42* (2007.01)

(52) U.S. Cl.
CPC ...... *H02M 3/33576* (2013.01); *H02M 1/4241* (2013.01); *H02M 1/44* (2013.01); *H02M 2001/0058* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 2007/4818; H02M 2007/4815; H02M 2007/4811; H02M 2001/0058; H02M 3/005; H02M 2003/1557; H02M 3/156; Y02B 70/1425; Y02B 70/1491
See application file for complete search history.

(56) References Cited

U.S. PATENT DOCUMENTS

| 4,785,387 A | 11/1988 | Lee et al. |
| 4,814,962 A | 3/1989 | Magalhaes et al. |
| 4,876,635 A | 10/1989 | Park et al. |

(Continued)

FOREIGN PATENT DOCUMENTS

| TW | 200533044 A | 10/2005 |
| TW | 200635170 A | 10/2006 |

(Continued)

OTHER PUBLICATIONS

International Search Report and Written Opinion issued in International Application No. PCT/US2018/028486, dated Jul. 2, 2018, 17 pages.

(Continued)

*Primary Examiner* — Bryan R Perez
(74) *Attorney, Agent, or Firm* — Fish & Richardson P.C.

(57) ABSTRACT

In some implementations, a programmable power adapter includes a first set of switches, a resonant circuit, a transformer, and a second set of switches. The power adapter includes control circuitry configured to provide control signals that change the voltage conversion ratios of the first set of switches and the second set of switches. The control circuitry can provide control signals causing the first set of switches to operate in one of multiple operating modes that each correspond to a different voltage conversion ratio, and the control circuitry can provide control signals causing the second set of switches to operate in one of multiple operating modes that each correspond to a different voltage conversion ratio.

19 Claims, 5 Drawing Sheets

(56) References Cited

U.S. PATENT DOCUMENTS

| | | | |
|---|---|---|---|
| 5,388,040 | A | 2/1995 | Hall et al. |
| 5,438,498 | A | 8/1995 | Ingemi |
| 5,640,082 | A | 6/1997 | Lusher et al. |
| 5,684,678 | A | 11/1997 | Barrett |
| 5,777,859 | A | 7/1998 | Raets |
| 5,780,986 | A | 7/1998 | Shelton et al. |
| 5,781,418 | A | 7/1998 | Chang et al. |
| 5,805,432 | A | 9/1998 | Zaitsu et al. |
| 5,986,895 | A | 11/1999 | Stewart et al. |
| 6,081,439 | A | 6/2000 | Saint-Pierre et al. |
| 6,137,234 | A | 10/2000 | Willaert et al. |
| 6,151,231 | A | 11/2000 | Saint-Pierre et al. |
| 6,304,461 | B1 | 10/2001 | Walker |
| 6,344,979 | B1 | 2/2002 | Huang et al. |
| 6,400,582 | B1 | 6/2002 | Hemena et al. |
| 6,538,909 | B2 | 3/2003 | Goodarzi |
| 7,453,710 | B2 | 11/2008 | Baurle et al. |
| 7,746,670 | B2 | 6/2010 | Kawasaki et al. |
| 7,999,526 | B2 | 8/2011 | Ilic et al. |
| 8,395,914 | B2 | 3/2013 | Klootwikh et al. |
| 8,735,763 | B2 | 5/2014 | Hasimoto et al. |
| 9,048,727 | B2 | 6/2015 | Giuliano et al. |
| 9,059,636 | B2 | 6/2015 | Lehn et al. |
| 9,065,341 | B2 | 6/2015 | Murakami et al. |
| 9,281,753 | B2 | 3/2016 | Reddy |
| 9,318,968 | B2 | 4/2016 | Lehn |
| 2005/0207180 | A1 | 9/2005 | Pansier |
| 2007/0171679 | A1 | 7/2007 | Nielsen et al. |
| 2007/0236967 | A1 | 10/2007 | Liu et al. |
| 2008/0259647 | A1 | 10/2008 | Risseeuw |
| 2009/0034298 | A1 | 2/2009 | Liu et al. |
| 2009/0290385 | A1 | 11/2009 | Jungreis et al. |
| 2012/0249059 | A1 | 10/2012 | Matsumae et al. |
| 2014/0184189 | A1 | 7/2014 | Salem |
| 2015/0207415 | A1* | 7/2015 | Caiafa ............ H02M 3/33507 363/21.02 |
| 2015/0349562 | A1 | 12/2015 | Minegishi et al. |
| 2016/0162840 | A1 | 6/2016 | Roberts et al. |
| 2016/0294294 | A1 | 10/2016 | Ye et al. |
| 2016/0365795 | A1 | 12/2016 | Madsen et al. |
| 2017/0063251 | A1* | 3/2017 | Ye ................. H02M 3/33576 |
| 2017/0237339 | A1 | 8/2017 | Young et al. |
| 2017/0279287 | A1* | 9/2017 | Solodovnik ........... H02J 7/0052 |

FOREIGN PATENT DOCUMENTS

| | | |
|---|---|---|
| TW | 200826463 A | 6/2008 |
| TW | 200937793 A | 9/2009 |
| TW | 201720036 A | 6/2017 |
| WO | WO 2016037287 | 3/2016 |

OTHER PUBLICATIONS

Mohan et al. "Power Electronics Converters, Applications and Design," Power Electronics Converters, Applications and Design, John Wiley & Sons, Jan. 1, 2003, 1 page.

'en.wikipedia.org' [online] "Ceramic Capacitor," Last Updated On: Aug. 28, 2017, [retrieved on Aug. 31, 2017] Retrieved from Internet: URL<https://en.wikipedia.org/wiki/Ceramic_capacitor> 21 pages.

'en.wikipedia.org' [online] "PID controller," Last Updated on : Aug. 31, 2017, [retrieved on Aug. 31, 2017] Retrieved from Internet: URL<https://en.wikipedia.org/wiki/PID_controller> 12 pages.

'www.cui.com' [online] "Compensation Methods in Voltage Regulators an Evolution from Analog to Digital," Nov. 2012, [retrieved on Aug. 31, 2017] Retrieved from Internet: URL<http://www.cui.com/catalog/resource/compensation-methods-in-voltage-regulators.pdf> 5 pages.

'www.digikey.com' [online] "A Review of Zero-Voltage Switching and its Importance to Voltage Regulation," Steven Keeping, Aug. 5, 2014, [retrieved on Aug. 31, 2017] Retrieved from Internet: URL<https://www.digikey.com/en/articles/techzone/2014/aug/a-review-of-zero-voltage-switching-and-its-importance-to-voltage-regulation> 6 pages.

'www.digikey.com' [online] "The Rose of Slope Compensation in Current-Mode-Controlled Voltage Regulators," Steven Keeping, Jan. 20, 2015 [retrieved on Aug. 31, 2017] Retrieved from Internet: URL<https://www.digikey.com/en/articles/techzone/2015/jan/the-role-of-slope-compensation-in-current-mode-controlled-voltage-regulators> 4 pages.

'www.eetimes.com' [online] "LLC resonant topology lowers switching losses, boosts efficientcy," Carl Walding, Aug. 28, 2008 [retrieved on Aug. 7, 2017] Retrieved from Internet: URL<http://www.eetimes.com/document.asp?doc_id=1273871> 7 pages.

'www.onsemi.com' [online] "Analysis and Design of Quasi-Square Wave Resonant Converters," Powerpoint, Last update date: unknown [retrieved on Aug. 31, 2017] Retrieved from Internet: URL<https://www.onsemi.com/pub/Collateral/TND348-D.PDF> 63 slides.

'www.pdx.edu' [online] "Input and output Impedance, PH-315" A. La Rosa, 2013, [retrieved on Aug. 30, 2017] Retrieved from Internet: URL<https://www.pdx.edu/nanogroup/sites/www.pdx.edu.nanogroup/files/2013_Input_output_impedance_9.pdf> 20 pages.

'www.st.com' [online] "An2644 Application Note: An introduction to LLC resonant half-bridge converter," Sep. 2008 [retrieved on Aug. 30, 2017] Retrieved from Internet: URL<http://www.st.com/content/ccc/resource/technical/document/application_note/de/f9/17/b7/ad/9f/4d/dd/CD00174208.pdf/files/CD00174208.pdf/jcr:content/translations/en.CD00174208.pdf > 64 pages.

'www.st.com' [online] "L6591: PWM controller for ZVS half bridge," Aug. 2012 [retrieved on Aug. 31, 2017] Retrieved from Internet: URL<http://www.st.com/content/ccc/resource/technical/document/datasheet/13/33/01/0d/bc/2c/4d/0d/CD00201721.pdf/files/CD00201721.pdf/jcr:content/translations/en.CD00201721.pdf> 41 pages.

Abdel-Rahman. "Chapter 6 Soft-Switching dc-dc Converters outlines," Chapter 6 Lecture 1 EEL6246 Power Electronics II, Florida Power Electric Center, University of Central Florida, 13 slides.

Arrigo. "Input and Output Capacitor Selection," Texas Instruments Application Report, SLTA055, Feb. 2006, 11 pages.

Carter. "High-speed notch filters," Analog Applications Journal, Texas Instruments Incorporated, 2006, 8 pages.

Choi. "Charge current control for LLC resonant converter," IEEE Applied Power Electronics Conference and Exposition, Mar. 15-19, 2015, 5 pages.

Hu et al. "Bang-Bang Charge Control for LLC Resonant Converters," IEEE Transaction on Power Electronics, 20(2), Feb. 2015, 16 pages.

Hu et al. "Bang-Bang charge control for LLC resonant converters," Proceedings of Energy Conversion Congress and Exposition, Sep. 2013, 7 pages.

Huang. "Feedback Loop Design on an LLC Resonant Power Converter," Texas Instruments, Application Report SLUA582A, Revised Nov. 2010, 9 pages.

Jang et al. "A New Three-Level Soft-Switched Converter," 18th Annual IEEE Applied Power Electronics Conference and Exposition, Feb. 2003, 7 pages.

Lin et al. "Analysis and implementation of a new soft switching DC/DC PWM converter," IET Power Electronics, 6(1) Jan. 2013, 12 pages.

Pilawa-Podgurski et al. "Very High Frequency Resonant Boost Converters," IEEE Transaction on Power Electronics 24(6), Jun. 2009, 7 pages.

Ranjitha et al. "Soft Switching with Cascaded Transformers to Drive the PMDC Motor." International Journal of Advanced Research in Electrical, Electronics and Instrumentation Engineering 4(2), Feb. 2015, 8 pages.

Shanthi et al. "A Simple Design and Simulation of Full Bridge LLC Resonant DC-DC Converter for Pv Applications," Middle-East Journal of Scientific Research 23(2) 2015, 8 pages.

Tang. "Average current-mode control and charge control for pWM converters," PhD dissertation, Virginia Tech, 1994, 189 pages.

Vavilala et al. "Implementation of PWM Soft Single Switched DC-DC Converters with Coupled Inductors," Recent, 15(1), Mar. 2014, 11 pages.

Yang. "Chapter 4: LLC Resonant Converter," Topology investigation of front end DC/DEC converter for distributed power system, PhD dissertation, Sep. 12, 2003, 48 pages.

(56) References Cited

OTHER PUBLICATIONS

Yang. "Chapter 6: Small signal analysis and control design of LLC converter," Topology investigation of front end DC/DC converter for distributed power system, PhD dissertation, Sep. 12, 2003, 50 pages.
Yu et al. "Driver Based Soft Switch for Pulse-Width-Modulated Power Converters," PhD Dissertation, Virginia Polytechnic Institute and State University, Feb. 23, 2005, 187 pages.
Zhang et al. "Modeling and Loop Compensation Design of Switching Mode Power Supplies," Application Note 149, Linear Technology, Jan. 2015, 22 pages.
TW Office action issued in Taiwanese Application No. 107117654, dated Jan. 8, 2019, 18 pages. (with English translation).

* cited by examiner

PROGRAMMABLE POWER ADAPTER

BACKGROUND

Various types of electronic devices are powered by different direct current (DC) input voltages. Typically, devices operating using DC power employ a power adapter to supply DC power from alternating current (AC) sources.

SUMMARY

In some implementations, a power adapter can be configured to selectively provide DC power at any of multiple output voltages with high efficiency. The power adapter may include a DC-DC resonant converter with multiple configurable conversion stages, so that in operation the configurations of the stages can be varied to produce different output voltages while operating the resonant circuit at a switching frequency near resonance to maintain high conversion efficiency. In some implementations, at least two conversion stages are included, and each conversion stage has at least two modes of operation providing a different ratio between input voltage and output voltage for the stage. For example, each of the stages may be configured to select between a first mode providing a 1:1 conversion ratio and a second mode providing a 2:1 or 1:2 conversion ratio. In this arrangement, a total conversion ratio for two stages can be selectable between at least three options, such as 1:1, 2:1, and 4:1. Additional conversion may be provided by a transformer, by additional stages of the resonant converter, and/or by varying the switching frequency to vary the gain of the resonant circuit. Control circuitry can also manage changes between the options to provide gradual transitions in output voltage.

Consumer electronics that operate using DC voltages are typically powered or charged from an AC utility line through an AC/DC power adapter. The DC voltage and power required at the output of the adapter can vary greatly depending upon the electronic device: a laptop computer with a multi-cell battery pack may require 20 V and up to 100 W, while a mobile phone with a single cell Li-ion polymer battery may require only 5 V and up 27 W. Additionally, nominal AC line voltages vary significantly depending upon geographic location, with US and Canadian utilities supplying 120 VAC and much of Europe distributing 230 VAC single-phase power.

Emerging standards for universal power delivery that target broad device compatibility require power adapters that can accommodate a wide range of input voltages while also delivering the wide range of output voltage necessary for various device loads. For example, a fully universal USB-PD-compliant adapter must accommodate input AC line voltages from 90 VAC to 264 VAC while supplying output voltages that can range between 3 V and 20 V for the programmable power supply mode.

In some implementations, a highly-efficient power adapter is configured to accept a voltage from a range of input voltages and is able to supply a selected voltage from a range of DC output voltages. For example, the power adapter can include a DC-DC power converter, which includes a primary-side circuit that can be configured to selectively convert a DC input voltage to a pulsed output, e.g., a square-wave, having a voltage set according to any of multiple different selectable conversion ratios. The primary-side circuit is followed by a resonant tank, such as an inductor-inductor-capacitor (LLC) circuit, and a transformer, that convert the square-wave voltage to an intermediate AC voltage. The resonant tank and the transformer can provide a fixed voltage conversion ratio. The switching frequency of the pulsed output of the primary-side circuit is set near the resonance frequency of the tank to provide a high conversion efficiency. The transformer is followed by a secondary-side circuit which converts the intermediate AC voltage signal to a DC output voltage. The secondary-side circuit can be configured to selectively provide a DC output voltage according to any of multiple different selectable conversion ratios. With the primary-side circuit and the secondary-side circuit each allowing separately selectable conversion ratios, the power adapter can accept a wide range of input voltages and supply a wide range of DC output voltages while optionally operating the resonant tank and transformer at a fixed frequency to maintain high efficiency. Also, using each of the operating modes, the frequency may be varied as appropriate to adjust the output voltage.

In some implementations, the frequency of the pulsed output may be varied to change the gain of the resonant tank and provide additional DC output voltages, e.g., voltages between the ones provided by certain operating modes discussed below. For example, a converter may have two operating modes that provide 5V and 10V outputs, respectively, at a baseline pulse frequency at or near the resonant frequency of the converter. The control circuitry may be configured to vary the frequency of the switched output and/or the duty cycle (e.g., pulse widths) as needed to provide any appropriate voltage in the range of 5V to 10V. This ability can be used to provide a soft start or gradual transition from one output voltage to another. Similarly, the control circuitry may adjust other operating parameters, e.g., switching between half bridge and full-bridge operation, gradually or periodically opening or closing back-to-back transistors, etc.

In some implementations, the power adapter includes a control module that manages and adjusts operation of the DC-DC power converter. The control module may configure the power adapter by selecting the primary-side circuit voltage conversion ratio, by selecting the secondary-side circuit voltage conversion ratio, or by selecting both the primary-side circuit voltage conversion ratio and the secondary-side circuit voltage conversion ratio. The control module can modify the configuration of the power adapter during operation, providing a gradual transition between different voltage conversion ratios in the primary-side circuit, in the secondary-side circuit, or in both the primary-side circuit and the secondary-side circuit. In some implementations, the control module may employ soft-switching techniques to maintain high efficiency and/or charge mode control techniques to increase the bandwidth of the converter.

In one general aspect, a power conversion circuit includes: a first set of switches configured to selectively convert a DC input voltage to a pulsed output at different voltage conversion ratios in a set of first voltage conversion ratios; a resonant circuit arranged to receive the pulsed output of the switched converter and provide a resonant circuit output; a transformer arranged to convert the resonant circuit output to a transformer output; a second set of switches arranged to selectively convert the transformer output to a DC output voltage at different voltage conversion ratios in a second set of voltage conversion ratios; and control circuitry configured to provide control signals that change the voltage conversion ratios of the first set of switches and the second set of switches. The control circuitry is configured to: provide control signals causing the first set of switches to operate in one of multiple operating modes that each correspond to a different one of the first voltage conversion ratios, wherein the multiple operating modes are respectively capable of providing the first voltage conversion ratios at a same switching frequency and duty cycle of the first set of switches; and provide control signals causing the second set of switches to operate in one of multiple operating modes that each correspond to a different one of the second voltage conversion ratios, wherein the multiple operating modes are respectively capable of providing the second voltage conversion ratios at a same switching frequency and duty cycle of the second set of switches.

Implementations may include one or more of the following features. For example, in some implementations the control circuitry is configured to cause the power conversion circuit to selectively vary the DC output such that the voltage of the DC output is selectable from among a group including (i) a first voltage, (ii) a second voltage that is twice the first voltage, and (iii) a third voltage that is four times the first voltage. The power conversion circuit is configured to selectively generate each of the first, second, and third voltages with the first set of switches and the second set of switches both operating within 30% of the resonant frequency of the resonant circuit. In some implementations, the power conversion circuit is capable of selectively generating each of the first, second, or third voltages at the same frequency, which may be, for example, within 30%, 20%, or 10% of the resonant frequency.

In some implementations, the first set of switches is a bridge converter configured to operate in full bridge mode or half bridge mode according to the control signals from the control module.

In some implementations, the second voltage can be obtained by two different operating modes of the power conversion circuit.

In some implementations, the first set of switches is a stacked bridge converter.

In some implementations, the first set of switches is operable to convert the DC input voltage at a first voltage conversion ratio of 2:1 and a second voltage conversion ratio of 1:1 using the same frequency and duty cycle.

In some implementations, the resonant circuit is an LLC tank circuit.

In some implementations, the second set of switches includes a full bridge switching rectifier.

In some implementations, the second set of switches includes a configurable voltage doubler circuit.

In some implementations, the configurable voltage doubler circuit includes two capacitors coupled in series, and two FETs coupled in series, the two FETs being coupled between a terminal of the transformer and a node between the two capacitors.

In some implementations, the second set of switches is operable to convert the DC input voltage at a first voltage conversion ratio of 2:1 and a second voltage conversion ratio of 1:1 using the same frequency.

In some implementations, the second set of switches is operable to convert the DC input voltage at a first voltage conversion ratio of 1:1 and a second voltage conversion ratio of 1:2 using the same frequency.

In some implementations, the control circuitry varies frequency or duty cycle of the first set of switches for a soft start.

In some implementations, the control circuitry gradually turns on back-to-back transistors of the second set of switches and uses a linear mode to limit the current for transition between operating modes of the second set of switches.

In some implementations, the power conversion circuit communicates with a device over an interface to obtain information indicating the output voltage needed.

In another general aspect, a method includes: operating a programmable power adapter to provide a first output voltage by: using a first set of switches to convert a DC input voltage to a pulsed output, wherein the first set of switches is operated in an operating mode from among multiple operating modes capable of providing different voltage conversion ratios at a same switching frequency; providing the pulsed output to a circuit includes a resonant circuit and a transformer; and using a second set of switches to convert the output of the transformer to a DC output voltage, wherein the first set of switches is operated in an operating mode from among multiple operating modes capable of providing different voltage conversion ratios at a same switching frequency.

Implementations may include one or more of the following features. For example, in some implementations, the method includes after operating a programmable power adapter to provide a first output voltage, operating the programmable power adapter to provide a second output voltage by changing the operating mode of the first set of switches or the second set of switches.

In some implementations, the method includes gradually transitioning between the operating modes used to generate the first voltage output and operating modes used to generate the second voltage output.

In some implementations, the first set of switches is capable of operating in each of a set of operating modes includes two or more of a voltage divider mode, a voltage singler mode, and a voltage doubler mode; and the first set of switches is capable of operating in each of a set of operating modes includes two or more of a voltage divider mode, a voltage singler mode, and a voltage doubler mode.

In some implementations, the method includes receiving, by the programmable power adapter, data indicating a particular output voltage of a device connected to the programmable power adapter; and based on the received data, generating control signals to operate the first set of switches and the second set of switches at operating modes selected to for generating the particular output voltage.

In some implementations, the power adapter disclosed in the application can provide one or more of the following advantages. By separately selecting a primary-side circuit configuration and a secondary-side circuit configuration, the power adapter can accept one of multiple input voltages and provide one of multiple DC output voltages. The voltage conversion ratio of the combined primary-side and secondary-side circuits can be selected between multiple ratios, for instance 1:1, 2:1, and 4:1. By operating at or near the resonance frequency of the tank, the power adapter can provide any of multiple selectable DC output voltages with high efficiency. The power adapter can gradually transition between different DC output voltages.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
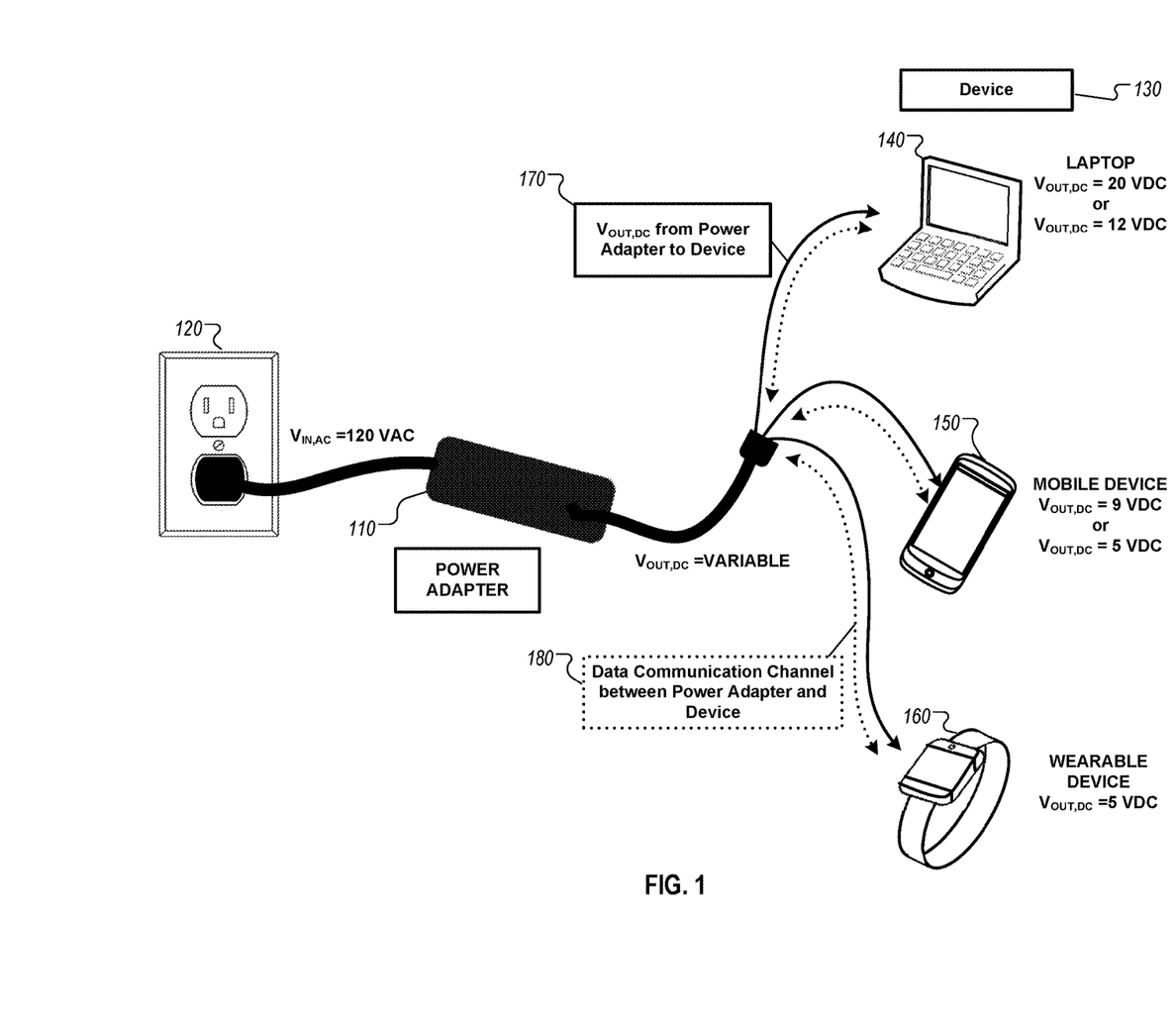
FIG. 1 is a diagram that illustrates an example of a programmable power adapter.

FIG. 1 is a diagram that illustrates an example of a programmable power adapter 110. The power adapter 110 can be used to power different electronic devices that require different input voltages. The power adapter 110 accepts an AC input voltage and provides a selectable DC output voltage. The DC output voltage can vary based on the requirements of the electronic device connected to the power adapter 110.

At its input, the power adapter 110 connects to an AC power source 120. The AC power source 120 may be a wall-outlet providing AC line power from a local utility, as depicted in FIG. 1. The AC power source 120 may also be another type of power source, for instance, a mobile power inverter. The AC power may be provided at 120 VAC, 60 Hz, as is typically provided by US utilities, at 230 VAC, 50 Hz, as is typically provided by European utilities, or at a different voltage and frequency.

The power adapter 110 connects to an electronic device 130. The electronic device 130 can be any of various types of devices, such as a personal computer, an audio receiver, an audio player, a digital media player, a display device, a mobile computing device, a mobile phone, an electronic toy, a television, a radio system, or any other electronic device that uses DC power. As an example, in FIG. 1 the power adapter 110 is shown connecting to any one of three different electronic devices: a laptop computer 140, a mobile device 150, such as a tablet or cellphone, and a wearable device 160, such as a smart watch. A single power adapter 110 may be used to power any of the devices 140, 150, and 160, even though each requires a different output voltage from the power adapter 110. As a result, a user need not carry three different power adapters for the three devices 140, 150, and 160, and can instead use a single power adapter 110 to charge the devices 140, 150, and 160 one at a time.

In FIG. 1, the power adapter 110 converts an AC input voltage received from the AC power source 120 to a DC output voltage 170 that is delivered to the connected electronic device 130. To power different electronic devices 130 that require different DC voltages to operate, the power adapter 110 may be capable of generating multiple different DC output voltages. For instance, in FIG. 1, the power adapter 110 provides a DC output voltage of 20 V DC or 12 V DC when connected to the laptop computer 140, a DC output voltage of 9 V when connected to the mobile device 140, or a DC output voltage of 5 V when connected to the wearable device 160.

To determine a DC output voltage that the power adapter 110 should generate, the power adapter 110 and the electronic device 130 may communicate over a data communication channel 180. This data communication may allow the power adapter 110 to automatically adjust the output of the power adapter 110 to meet the requirements of the connected electronic device 110, without the need for a user to indicate the required power. For example, the user can simply disconnect the power adapter 110 from one device and connect the power adapter 110 to the desired device. Control circuitry of the power adapter 110 can detect when the power adapter 110 is connected to and disconnected from a device.

Data communication through channel 180 may occur in one direction (e.g. from device 130 to power adapter 110) or in two directions (e.g. from device 130 to power adapter 110 and from power adapter 110 to device 130). Any of various communication protocols may be used for communication between the power adapter 110 and the device 130. For example, the power adapter 110 may communicate with the device 130 using the Universal Serial Bus-Power Delivery (USB-PD) protocol. Based on communication between the power adapter 110 and the device 130, the power adapter 110 determines the DC output voltage required by the connected device 130 and internally configures the power adapter 110 to generate the required DC output voltage 170. In addition, or as an alternative, the power adapter 110 may include buttons, switches, or other controls that allow a user to manually select from among different output voltage options provided by the power adapter 110.

Figure 2:
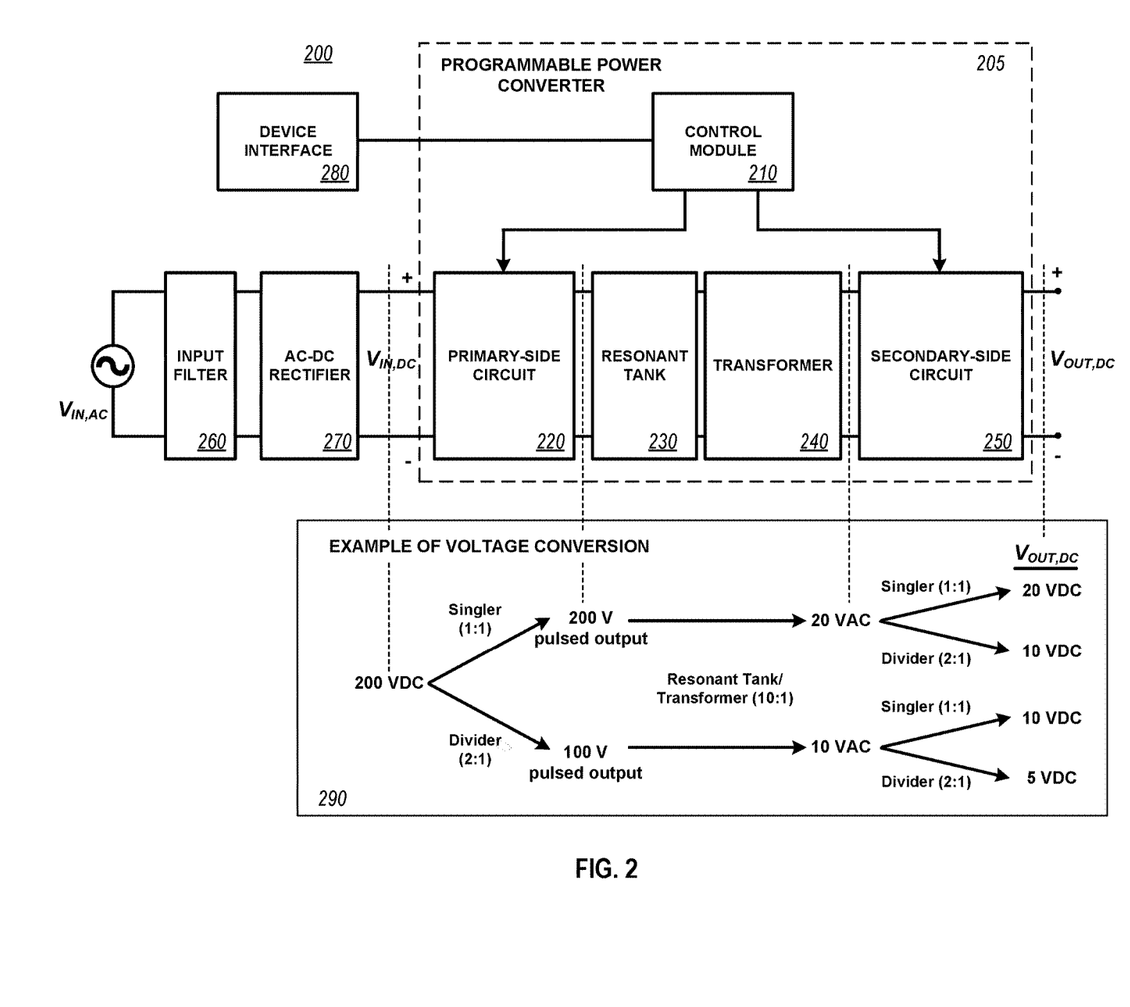
FIG. 2 is a block diagram that illustrates an example of a programmable power adapter.

FIG. 2 is a block diagram that illustrates an example of a programmable power adapter 200, as well as an example of voltage conversion using the programmable power adapter. The programmable power adapter 200 accepts an AC input voltage, which is then converted to a DC input voltage that is routed to a DC-to-DC programmable power converter 205. The power converter 205 includes a primary-side circuit 220, a resonant tank 230, a transformer 240, a secondary-side circuit 250, and a control module 210. The primary-side circuit 220 can be configured to selectively provide different voltage conversion ratios and the secondary-side circuit 250 can be configured to selectively provide different voltage conversion ratios. In this way, the power converter 205 can provide different DC output voltages while operating the resonant tank 230 and transformer 240 at a fixed conversion ratio to optimize for high efficiency.

The programmable power adapter 200 accepts as input an AC input voltage, which may be supplied, for instance, by an AC utility line. The AC input voltage may be 120 VAC, 60 Hz or another voltage and frequency.

The AC input may be passed through an input filter 260 and converted to a DC input voltage by an AC-DC rectifier 270. The AC-DC rectifier 270 may be a full-wave rectifier, a half-wave rectifier, or other rectification circuit. The AC-DC rectifier may contain circuitry to convert the DC input voltage to a specified voltage amplitude or perform other signal conditioning.

The AC-DC rectifier 270 provides a DC output to a power converter 205. The power converter 205 converts a DC input voltage to a DC output voltage with a selectable conversion ratio. The power converter 205 includes a primary-side circuit 220, followed by a resonant tank 230 and transformer 240, followed by a secondary-side circuit 250. The primary-side circuit 220 can be configured to output a pulsed output voltage, such as a quasi-square wave signal, at different voltage conversion ratios. The secondary-side circuit can also be configured to output a DC voltage at different conversion ratios. The primary-side circuit 220 and the secondary-side circuit 250 are configured by a control module 210. The control module may communicate with a device interface 280 to determine circuit configuration settings.

The primary-side circuit 220 accepts a DC input voltage and outputs a pulsed output voltage, which is routed to the resonant tank 230. In some implementations, the primary-side circuit 220 may comprise a set of switches. To generate the pulsed output voltage, the primary-side circuit 220 may include switches that pulse-width modulate (PWM) the DC input voltage, where the pulsed output voltage has a frequency and a duty cycle that may be determined by the operation of the switches. The frequency of the pulsed output voltage is typically set higher than the resonance of the resonant tank 230 and may range from tens of kHz to a few MHz in a practical design. For example, the switching frequency can be set within e.g., 30%, 15%, 10%, or 5% of the resonant frequency, and is typically higher than the resonant frequency. The switching elements in the primary-side circuit 220 may be implemented as field effect transistors (FETs), bipolar junction transistor (BJTs), insulated gate BJTs (IGBTs), heterojunction bipolar transistors (HBTs), high electron mobility transistors (HEMTs), or other controllable switching devices. The switching elements further may include semiconductors such as silicon, gallium arsenide, indium-phosphide, silicon carbide, gallium nitride, and their alloys.

Even though an LLC tank and a transformer provide a fixed conversion ratio, and the switching frequency of the converter is set near the resonant frequency of the resonant tank, the control circuitry can still perform small adjustments to the frequency to adjust the effective conversion ratio. For example, a 10V output is not a USB PD standard voltage level, but while in the 10V operating mode the control circuitry can adjust the switching frequency to regulate the output voltage to 9V. As another example, for outputting 15V, the converter can operate the system in the 20V output operating mode, and with that general operating condition make a small adjustment to the switching frequency to make the effective tank plus transformer conversion ratio a 40:3 ratio, instead of a 10:1 ratio.

Different circuit topologies can be used as a switch network of the primary-side circuit 220. For example, the primary side circuit 220 can include a full-bridge arrangement of switching elements or a stacked-bridge arrangement of switching elements. These and other circuits that may be used for the primary-side circuit 220 provide a selectively configurable step of voltage conversion.

For example, the primary-side circuit 220 may include a full-bridge circuit that can be configured to operate in either full-bridge mode or half-bridge mode. When operating in full-bridge mode, the pulsed output of the primary-side circuit has a voltage amplitude equal to the input DC voltage (centered about 0 V DC). This can be referred to as a "voltage singler" mode, because the ratio of input voltage to output voltage is 1:1, e.g., 1:1 voltage conversion. When the full-bridge circuit of the primary-side circuit 220 operates in half-bridge mode, the pulsed output will have a peak voltage equal to one-half the input DC voltage (centered about one-half the input DC voltage), resulting in voltage divider functionality, e.g., 2:1 voltage conversion. Thus, the primary-side circuit 220 enables selection between singler and divider (1:1 and 2:1 voltage conversion, respectively) operating modes without changing the frequency or duty cycle of the pulsed output. Control of the primary-side circuit 220 to achieve voltage regulation may involve varying the frequency and/or pulse width of pulses generated by the primary-side circuit 220. The operating mode of the primary-side circuit 220 is set by the control module 201, which may in turn receive input from the device interface 280.

The pulsed output generated by the primary-side circuit 220 is fed to a resonant tank 230, which is connected to a transformer 240. The resonant tank 230 is typically tuned to the fundamental frequency of the square wave and includes a resonant circuit may include reactive or reactive and resistive elements. For example, the resonant tank 230 may comprise a series inductor-capacitor (LC) circuit, a series-parallel inductor-inductor-capacitor-capacitor (LLCC) circuit, or an inductor-inductor-capacitor (LLC) circuit. In some implementations, when operated near resonance, the resonant tank provides nearly constant unity gain across wide load variations and provides high-efficiency through zero-voltage switching of the primary-side circuit 220 switches (e.g. soft-switching). Alternatively, when operated further from resonance, the LLC circuit provides lower gain, leading to a different voltage conversion ratio and enabling the programmable power converter 205 to provide a different DC output voltage.

The reactive and resistive elements of the resonant tank 230 may be independent components. The reactive and resistive elements of the resonant tank 230 may also be integrated or parasitic elements, such as the leakage and magnetizing inductance of the transformer, or the parasitic inductance, capacitance, and resistance of circuit components. The resonant tank 230 filters higher-order harmonics of the square wave voltage signal such that an effectively sinusoidal or piece-wise sinusoidal AC voltage signal is transmitted through the resonant circuit.

The resonant tank 230 is followed by a transformer 240. The transformer 240 converts an input AC voltage of a given amplitude to an output AC voltage of a different amplitude. The voltage conversion ratio of the transformer is typically based on the ratio of turns in the primary and secondary sides of the transformer and can be, for instance 10:1 or 20:1. The voltage conversion ratio of the transformer can also be any other conversion ratio. The transformer may be of any type or geometry, including laminated core, ferrite or ceramic core, solid core, powdered core, planar, coil, toroidal, spiral and resonant transformer implementations.

The AC voltage output by the transformer 240 is fed to a secondary-side circuit 250, which converts the AC voltage to a DC output voltage at a configurable voltage conversion ratio. The AC-DC rectification and voltage conversion functions of the secondary-side circuit 250 may comprise a single circuit, or may comprise multiple circuits implemented in series. For instance, the secondary-side circuit 250 may include an AC-DC rectification circuit followed by a configurable DC-DC conversion circuit. In some implementations, the secondary-side circuit 250 may comprise a set of switches.

The secondary-side circuit 250 can implement AC-DC rectification by various techniques. For example, the secondary-side circuit 250 may comprise a full-wave rectifier circuit incorporating diodes, a half-wave rectifier incorporating diodes, a full-wave rectifier incorporating actively switched elements, a half-wave rectifier incorporating actively switched elements, or any other circuit that provides AC-DC rectification.

The secondary-side circuit 250 can implement configurable voltage conversion by various techniques. For instance, the secondary-side circuit 250 may include a circuit that can be selectively operated in singler (1:1 voltage conversion) or divider (2:1 voltage conversion) mode. Alternatively, the secondary-side circuit 250 may include a circuit that can be selectively operated in singler (1:1 voltage conversion) or doubler (1:2 voltage conversion) modes. The operating mode of the secondary-side circuit 250 is set by the control module 201, which may receive input from a device interface 280.

The secondary-side circuit 250 may also include additional circuitry for signal conditioning, for instance, a low-pass filter for reducing ripple on the DC voltage signal.

The control module 210 provides various signals to the elements of the power converter 205. The control module 210 may use any of various control techniques, including frequency modulation control, pulse-width modulation control, or charge-based control. Charge control can be preferred to provide high bandwidth. Charge control can operate by switching the transistors of the primary-side circuitry based on the charge on the series resonant capacitor in the LLC tank, and thus may set the per-cycle charge on the capacitor. Charge control can be performed using the techniques disclosed in U.S. patent application Ser. No. 15/693,055, titled "HIGH BANDWIDTH RESONANT POWER CONVERTERS," filed Aug. 31, 2017, which is incorporated by reference herein in its entirety. The power converter 205 of FIG. 2, and the circuits shown in FIGS. 3 and 4 can use any of the techniques disclosed in the incorporated application, including charge control, control loop features, and techniques for reducing closed-loop output impedance.

The control module 210 may, for instance, provide one or more control signals to one or more switches in the primary-side circuit 220 or secondary-side circuit 250 to control whether a given switch is open or closed. The control signals provided by control module 210 may be synchronized with one another. For example, the control module 210 may provide synchronized control signals to multiple switches in the primary-side circuit 220 to pulse-width modulate a DC input voltage signal. For another example, the control module 210 may provide synchronized control signals to multiple switches in the secondary-side circuit 250 to implement AC-DC rectification. The transformer 240 provides isolation between the primary-side circuit 220 and the secondary-side circuit 250. In some implementations, the primary-side circuit 220 and the secondary-side circuit 250 may be independently controlled. Thus, while the control module 210 is shown controlling both the primary-side circuit 220 and the secondary-side circuit 250, the control signals for the primary-side circuit 220 and the secondary-side circuit 250 may be provided by separate devices or units. Similarly, in some implementations, the control signals for the primary-side circuit 220 are isolated from or are not dependent on the control signals from the secondary-side circuit 250, and vice versa.

The control module 210 may configure the primary-side circuit 220 by providing control signals that implement a selected operating mode of the primary-side circuit 220. For example, the control module 210 may provide control signals that cause the circuit of the primary-side circuit 220 to operate in singler mode (1:1 voltage conversion). Alternatively, the control module 210 may provide control signals that cause the circuit of the primary-side circuit 220 to operate in divider mode (2:1 voltage conversion). These control signals could be, for instance, signals that control whether a switch is open or closed. The control module 210 is not limited to selecting between singler and divider modes. The control module 210 may provide control signals that configure the primary-side circuit 220 into any available operating mode. Configuring the primary-side circuit 220 may include switching in circuit paths or blocking out circuit paths.

Similarly, the control module 210 may configure the secondary-side circuit 250 by providing control signals that a selected operating mode of the secondary-side circuit 250. For example, the control module 210 may provide control signals that cause the secondary-side circuit 250 to operate in singler mode (1:1 voltage conversion). As another example, the control module 210 may provide control signals that cause the secondary-side circuit 250 to operate in doubler mode (1:2 voltage conversion). As a third example, the control module 210 may provide control signals that cause the secondary-side circuit 250 to operate in divider mode (2:1 voltage conversion). These control signals could be, for instance, signals that control whether a switch is open or closed. The control module 210 is not limited to selecting between divider, singler, and doubler modes. The control module 210 may provide control signals that configure the secondary-side circuit 250 into any available operating mode. Configuring the secondary-side circuit 220 may include switching in circuit paths or blocking out circuit paths.

The control module 210 may receive inputs from a device interface 280. For example, through the device interface 280, the control module 210 may receive inputs related to communication with a device powered by the programmable power adapter 200. These inputs may be, for instance, inputs related to the USB-PD communication between the device and the programmable power adapter 200. The control module 210 may also receive other inputs. For example, the control module 210 may receive inputs indicating the DC input voltage and the DC output voltage. The control module 210 may also receive inputs required to control operation of the power converter 205, including indications of voltages, currents, and other characteristics of the circuits and components that comprise the power converter 205.

By incorporating selectable voltage conversion in both the primary-side circuit 220 and the secondary-side circuit 250, for a given DC input voltage ($V_{IN,DC}$ in FIG. 2) the power converter 205 can supply different DC output voltages ($V_{OUT,DC}$ in FIG. 2). Panel 290 depicts an example of voltage conversion through a power converter 205. In this example, the primary-side circuit 220 can be configured to operate in either voltage singler (1:1) or voltage divider (2:1) mode, and the secondary-side circuit 250 can be configured to operate in either voltage singler (1:1) or voltage divider (2:1) mode. As a result, the two stages can be configured to provide a combined 1:1, 2:1, or 4:1 voltage conversion. In the example of FIG. 2, the resonant tank 230 and transformer 240 provide 10:1 voltage conversion. Thus the power converter 205 can be configured to provide a voltage conversion ratio between DC input and output voltages of 10:1, 20:1, or 40:1. As shown in panel 290, for a DC input voltage of 200 V, these conversion ratios enable the power converter 205 to provide a DC output voltage of 20 V, 10 V, or 5 V.

Some implementations may provide other voltage conversion ratios by varying the switching frequency of the pulsed output voltage provided by the primary side circuit 220. Varying the switching frequency of the pulsed output voltage changes the operating frequency of this circuit including the resonant tank 230 and the transformer 240. As the operating frequency of the resonant circuit changes, the gain of the resonant circuit also changes, which modifies the voltage conversion ratio of the resonant tank 230/transformer 240 pair. In the example shown in panel 290, the switching frequency of the pulsed output voltage is set at or slightly above the resonance frequency of the resonant circuit. At the resonance frequency, the resonant circuit gain is nearly unity and the voltage conversion ratio of the resonant tank 230/transformer 240 pair is 10:1. Alternatively, if the frequency of the pulsed output voltage is higher than the resonant frequency of the resonant circuit, the gain of the resonant circuit will be less than one, reducing the amplitude of the AC voltage output. As a result, the resonant tank 230/transformer 240 pair will have a voltage conversion ratio greater than 10:1. For instance, a pulsed output voltage at an appropriate level above than the resonant frequency, the resonant tank 230/transformer 240 pair may have a voltage conversion ratio of 40:3.

By varying the switching frequency, the power converter 205 can provide different DC output voltages. For example, many USB-PD compliant devices require a 9 V DC output voltage. The power converter 205 can provide a DC voltage output of 9 V by increasing the switching frequency until the voltage conversion ratio of the resonant circuit is approximately 11:1. By configuring the primary-side circuit 220 as a divider (2:1 voltage conversion) and the secondary-side circuit 250 as a singler (1:1 voltage conversion), the power converter 205 provides a voltage conversion ratio from DC input voltage to DC output voltage of 22:1, which, for a DC voltage input of 200 V results in a DC output voltage of 9 V. Alternatively, the power converter 205 can provide a DC voltage output of 15 V by increasing the switching frequency until the voltage conversion ratio of the resonant circuit is 40:3. By configuring the primary-side circuit 220 as a singler (1:1 voltage conversion) and the secondary-side circuit as a singler (1:1 voltage conversion), the power converter 205 provides a voltage conversion ratio from DC input voltage to DC output voltage of 40:3, which, for a DC voltage input of 200 V results in a DC output voltage of 15 V.

Some implementations may provide different voltage conversion ratios by other means. For example, a resonant tank 230 and transformer 240 with a different conversion ratio could be selected to achieve a different voltage conversion for the power converter 205. Similarly, the primary-side circuit 220 and/or secondary-side circuit 250 could be designed to provide different voltage conversions to achieve other voltage conversion ratios for the power converter 205.

By coordinating the timing of the control signals, the control module 210 can gradually transition the power converter 205 between different operating modes. Here, gradual transition means that the DC output voltage of the power converter continuously varies without interruption from a first DC output voltage provided by a first power converter 205 configuration to a second DC output voltage provided by a second power converter 205 configuration. A power converter 205 configuration is a specific combination of primary-side circuit 220 operating mode and secondary-side circuit 250 operating mode. For example, a first power converter 205 configuration may be where the primary-side circuit 220 is configured to operate as a voltage singler and the secondary-side circuit 250 is configured to operate as a voltage singler. In this first configuration, the combined primary- and secondary-side voltage conversion ratio is 1:1. A second power converter 205 configuration may be where the primary-side circuit 220 is configured to operate as a voltage singler and the secondary-side circuit 250 is configured to operate as a voltage divider. In this second configuration, the combined primary- and secondary-side voltage conversion ratio is 2:1. In this example, the control module 210 can smoothly transition the power converter 205 from the first configuration to the second configuration, with the DC output voltage of the power converter 205 smoothly transitioning from a 1:1 voltage conversion to a 2:1 voltage conversion.

In some previous resonant power converters, the converter supplies different DC output voltages primarily by changing the switching frequency of the pulsed output to change the gain of the resonant tank. For many converters, only a single conversion ratio was available at the resonant frequency, so providing a large range of voltages required moving significantly away from the resonance frequency where highest efficiency is achieved. To cover a large range of DC output voltages, the resonant tank must operate over a large range of switching frequencies. Operating at frequencies far from the resonance frequency increases switching losses and reduces the power converter efficiency. Furthermore, resonant tanks designed to operate over a large range of frequencies typically have greater losses at all frequencies, further reducing the converter efficiency.

In contrast, the techniques disclosed in this document can selectively configure the primary-side circuit 220 and secondary-side circuit 250 to provide different conversion ratios while remaining near the resonance frequency. The power converter 205 is capable of providing different DC output voltages while operating the resonant tank at a frequency at or near resonance. By operating the resonant tank at or near resonance for all DC input and output voltages, the resonant tank 230 and transformer 240 can be optimized for a small frequency range and soft-switching techniques such as zero-voltage-switching or zero-current-switching can be effectively used to enable the power converter 205 to operate near its maximum efficiency for all DC input and output voltages. The significant shifts in frequency range can be performed by configuring the switch networks at the primary side and secondary side, rather than by frequency adjustment. In other words, rather than relying entirely on frequency shifting or duty cycle changes to change the voltage conversion ratio, the circuits in the present technique have multiple operating modes that use different switch network configurations to set the baseline conversion ratio at the resonant frequency.

For example, the programmable power converter 205 can have multiple operating modes that are each capable of providing a different voltage conversion ratio when switching at the resonant frequency. Each operating mode can have a baseline conversion ratio or output voltage at the resonant frequency. For any of the control modes, relatively small changes around this baseline, e.g., a 10%, 20%, or 30% change from the baseline conversion ratio, may be made by varying the switching frequency. However, the controller may make larger changes, such as changes of 50% or more by changing to another of the operating modes. Of course, limiting the amount of frequency-based output change is preferred to maximize efficiency.

The specific circuits that comprise the components of the power converter 205 illustrated in FIG. 2 can encompass many implementations.

Figure 3:
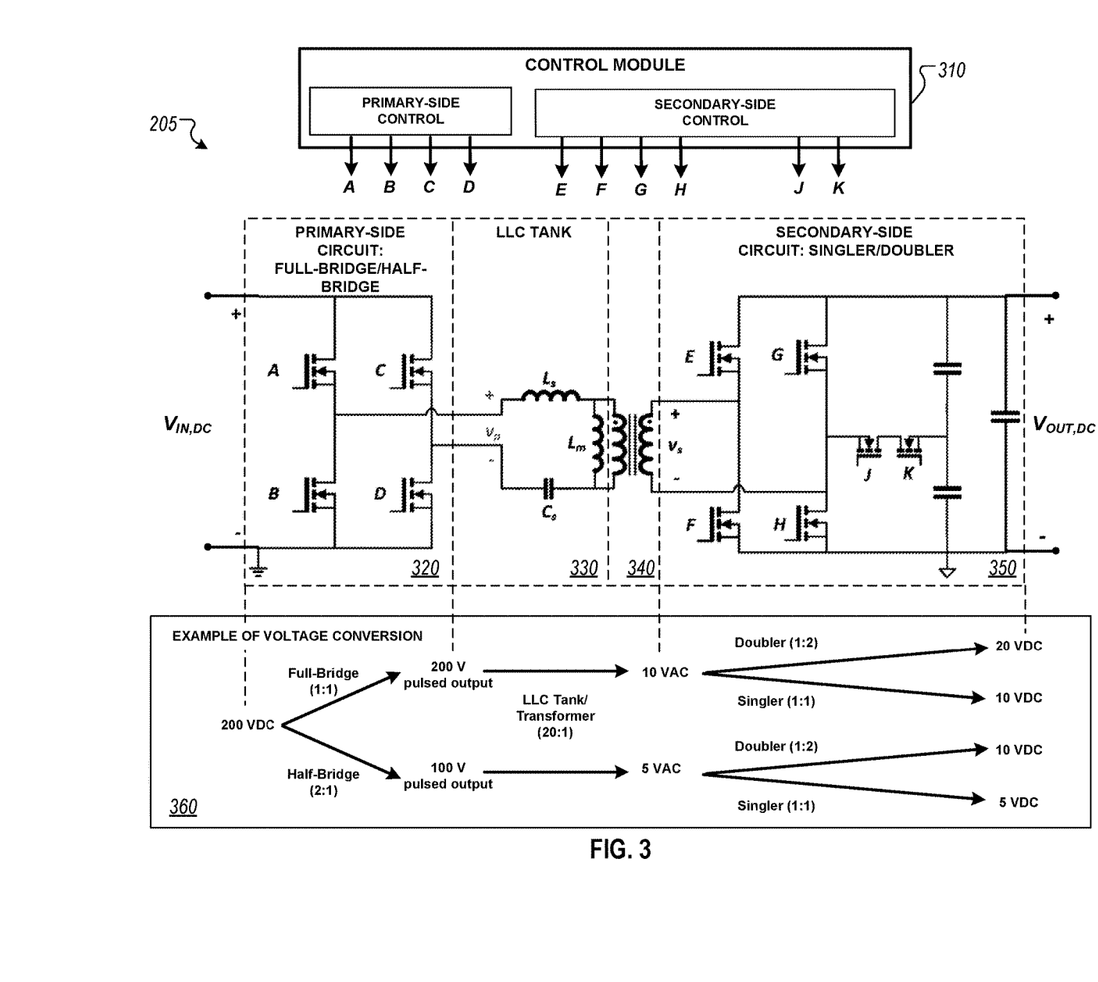
FIGS. 3 and 4 are schematic diagrams of examples of DC-DC converters for programmable power adapters.

FIG. 3 is a schematic diagram of one example of a DC-DC power converter 205 for a programmable power adapter. The power converter of FIG. 3 includes a primary-side circuit 320 which includes a full-bridge circuit, followed by an LLC resonant tank 330 and transformer 340. The output of the transformer 340 feeds a secondary-side circuit 350 composed of an active rectifier and a singler/doubler circuit. The full-bridge circuit of the primary-side circuit 320 can be configured to operate in either full-bridge or half-bridge mode, while the secondary-side circuit 350 can be configured to operate in either voltage singler or voltage doubler mode.

The full-bridge circuit of the primary-side circuit 320 includes four switches, A, B, C, and D, with one pair, A and B, connected in series and a second pair, C and D, connected in series. The common node of pair A and B is connected to one input terminal of the resonant tank 330, while the common node of pair C and D is connected to the other input terminal of the resonant tank 330. The switches may be implemented as FETs, BJTs, IGBTs, HBTs, HEMTs, or other controllable switching device. The state of each switch (open, where current cannot flow though the switch, or closed, where current can flow through the switch) is controlled by signals provided by the control module 310. In this example, the control module 310 provides individual control signals to each switch A through D, which set each switch to be open or closed at a given time.

The primary-side circuit 320 has multiple operating modes that provide different voltage conversion ratios, e.g., even for a consistent switching frequency. In the example, the operating modes are a singler mode and a divider mode. These operating modes are selectable by the control module 310 through the transistor drive signals provided by the control module 320.

By providing different control signals to switches A through D, the control module 310 can selectively configure the primary-side circuit 320 to operate in either singler (1:1 voltage conversion) or divider (2:1 voltage conversion) mode. For example, by providing control signals that alternate between a first switch state (A=D=closed; B=C=open) and a second switch state (A=D=open; B=C=closed), the control module 310 can cause the primary-side circuit 320 to operate in full-bridge singler mode, where the pulsed output voltage has an amplitude equal to the input DC voltage (1:1 voltage conversion). Alternatively, by providing control signals that alternates between a first switch state (A=open; B=closed) and a second switch state (A=closed; B=open) while switch C is open and switch D is closed, the control module 310 can cause the primary-side circuit 320 to operate in half-bridge divider mode, where the pulsed output voltage has an amplitude equal to one-half the DC input voltage (2:1 voltage conversion). Different switch configurations, switching schemes, and control signal configurations could be implemented to enable the primary-side circuit 320 to provide different voltage conversion ratios.

The secondary-side circuit 350 of the power converter of FIG. 3 includes an active rectification bridge circuit followed by a singler/doubler circuit. The active rectification bridge circuit contains four switches, E, F, G, and H, whose switch states (open or closed) can be synchronized to convert the AC voltage signal generated by the transformer 340 to a DC voltage signal. Synchronous control of the switch states may be provided by the control module 310 or by other circuitry. The switching elements E through H may be implemented as FETs, BJTs, IGBTs, HBTs, HEMTs, or other controllable switching device.

The singler/doubler circuit of the secondary-side circuit 350 includes a switched capacitive network incorporating two back-to-back switches, J and K, and three capacitors. The switching elements J and K may be implemented as FETs, BJTs, IGBTs, HBTs, HEMTs, or other controllable switching device. The switches J and K can be controlled independently by signals provided by the control module 310 and each switch can be set to an open or closed state.

The secondary-side circuit has 350 has multiple operating modes that provide different voltage conversion ratios, e.g., even for a consistent switching frequency. In the example, the operating modes are a singler mode and a doubler mode. These operating modes are selectable by the control module 310 through the transistor drive signals provided by the control module 320 to the switches J and K.

By providing different control signals to switches J and K, the control module 310 can selectively configure the secondary-side circuit 350 to operate in either singler (1:1 voltage conversion) or doubler (1:2 voltage conversion) mode. For example, by providing control signals that set both switches J and K open, the control module 310 can configure the secondary-side circuit 350 to provide 1:1 voltage conversion. Alternatively, by providing control signals that set both switches J and K closed, the control module 310 can configure the secondary-side circuit 350 to provide 1:2 voltage conversion. Different switch configurations, switching schemes, and control signal configurations could be implemented to enable the secondary-side circuit 350 to provide different voltage conversion ratios.

Panel 360 depicts an example of voltage conversion through the power converter of FIG. 3. In this example, the primary-side circuit 320 can be configured to operate in either full-bridge singler (1:1) or half-bridge divider (2:1) mode, and the secondary-side circuit 350 can be configured to operate in either singler (1:1) or doubler (1:2) mode. As a result, the two stages can be configured to provide a combined 1:2, 1:1, or 2:1 voltage conversion. In the example of FIG. 3, the resonant tank 230 and transformer 240 provide 20:1 voltage conversion. Thus the power converter can be configured to provide a voltage conversion ratio between DC input and output voltages of 10:1, 20:1, or 40:1. As shown in panel 390, for a DC input voltage of 200 V, these conversion ratios enable the power converter of FIG. 3 to provide a DC output voltage of 20 V, 10 V, or 5 V.

As shown in FIG. 3, there are different combinations of operating modes that can achieve the 10 VDC output, e.g., (1) with the primary-side circuit 320 in singler mode and the secondary-side circuit 350 in singler mode, and (2) with the primary-side circuit 320 in divider mode and the secondary-side circuit 350 in doubler mode. This overlap in the available configurations is not required in all implementations, but can be helpful in achieving flexibility of the converter 205. For example, with overlapping combinations of operating modes, the converter 205 can transition among a variety of output levels and interpolate outputs in a wide range while remaining efficient. In some implementations, by switching operating modes of the primary-side circuit 320 and the secondary-side circuit 350, and by varying the switching frequencies, the converter 320 may be able to provide any voltage output in the range of 5V to 20V, and may provide conversion efficiencies better than pulse-width controlled systems. The converter 320 can use this ability to provide a soft start, e.g., to avoid voltage spikes when a device is first connected to power, or when a new voltage output is set for the converter 320. Similarly, the converter 320 can gradually change voltage to switch between different modes. For example, the back-to-back transistors J and K can be gradually turned on to gradually alter voltage. Similarly, the control module 310 may quickly alternate between half-bridge and full-bridge operation, at varying rates, to adjust voltage output levels as well.

As shown in FIG. 3, the operating modes of the primary-side circuit 320 and the secondary-side circuit 350 can represent different switching configurations, e.g., configurations in which certain circuit paths are disabled or turned off. For example, for half-bridge divider mode for the primary-side circuit 320, switch C is held open, effectively blocking that circuit path. This occurs not just for a single cycle or portion of a cycle, but as a steady-state condition. By contrast, in full-bridge singler mode, the switch C is switched on and off in the bridge, opening up that path. In a similar manner, in the secondary-side circuit 350, the switches J and K are selectively held open or held closed, over the entire switching cycle, to provide different operating modes with different conversion ratios. Thus, restricting or disallowing certain circuit paths, as a result of control signals, is one way to select an operating mode. Nevertheless, there are other ways of using control signals to select operating modes, which may involve varying other aspects of circuit operation, such as the timing of switches, the cycling of control signals, and so on.

Figure 4:
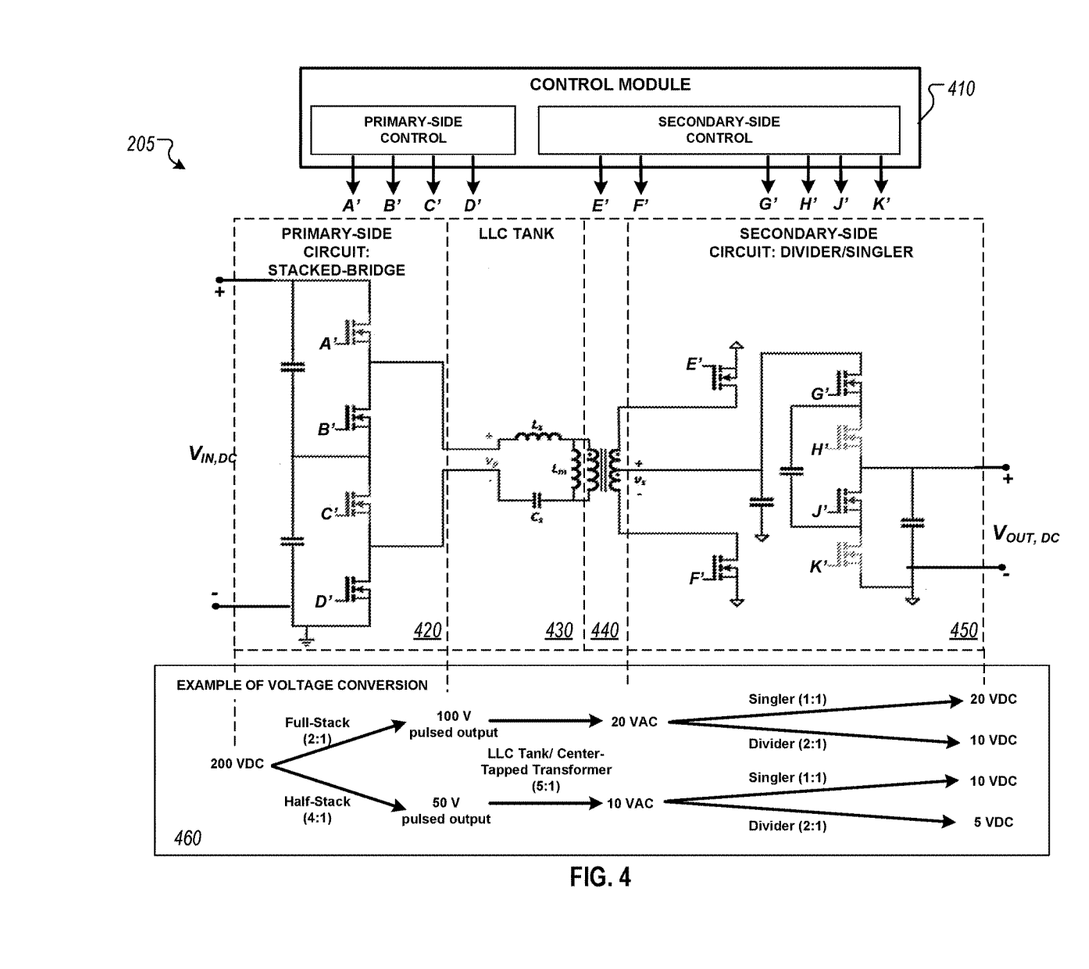

FIG. 4 is a schematic diagram of another example of power converter 205. The power converter of FIG. 4 includes a primary-side circuit 420 which includes a stacked-bridge circuit, followed by an LLC resonant tank 430 and center-tapped transformer 440, which feed a secondary-side circuit 450 that includes a two-element rectifier and a singler/divider circuit.

The primary-side circuit 420 includes a stacked-bridge circuit with four switches, A', B', C', and D', arranged in series. The switches may be implemented as FETs, BJTs, HBTs, IGBTs, HEMTs, or other controllable switching device. The common node between switch pair A' and B' is connected to one input terminal of resonator tank 430, while the common node between switch pair C' and D' is connected to the other terminal of resonator tank 430. The state of each switch is controlled by signals provided by the control module 410. In this example, the control module 310 provides individual control signals to each switch A' through D', which set each switch to be open or closed at any given time.

By providing different control signals to switches A' through D', the control module 410 can selectively configure the primary-side circuit 420 to operate in either divider (2:1 voltage conversion) mode or quarter-divider (4:1 voltage conversion) mode. By providing control signals that alternate between a first switching state (A'=D'=closed; B'=C'=open) and a second switching state (A'=D'=open; B'=C'=closed) the control module 410 can configure the primary-side circuit 420 to operate in full-stack divider mode, where the amplitude of the pulsed DC output is one-half the DC input voltage (2:1 conversion ratio). Alternatively, by providing control signals that cycle sequentially between a first switching state (A'=C'=closed; B'=D'=open), a second switching state (B'=C'=closed; A'=D'=open), a third switching state (B'=D'=closed; A'=C'=open), and a fourth switching state (B'=C'=closed; A'=D'=open) with equal duration, the control module 410 can configure the primary-side circuit 420 to operate in half-stack quarter-divider mode, where the amplitude of the pulsed DC output is one-quarter the DC input voltage (4:1 conversion ratio). In this configuration, each of the states occurs for 25% of the switching period. Different switch configurations, switching schemes, and control signal configurations could be implemented to enable the primary-side circuit 420 to provide different voltage conversion ratios.

The secondary-side circuit 450 of the power converter of FIG. 4 includes a two-element full-wave rectifier followed by a divider/singler converter. The full-wave rectifier accesses a center-tapped transformer 440 and includes switches E' and F', whose states can be synchronized to convert the AC voltage signal generated by the transformer 440 to a DC voltage signal. Synchronous control of the switch states may be provided by the control module 410 or other circuitry. The switching elements E' and F' may be implemented as FETs, BJTs, HBTs, IGBTs, HEMTs or other controllable switching devices.

The divider/singler circuit of the secondary-side circuit includes a switched capacitive circuit with switching elements G', H', J', and K' and multiple capacitors. The switching elements G' through K' may be implemented as FETs, BJTs, HBTs, IGBTs, HEMTs or other controllable switching devices. The control module 410 can provide signals to control each switch G' through K' independently, where each switch can be set to an open or closed state.

By providing different control signals to switches G' through K', the control module 410 can selectively configure the secondary-side circuit 450 to operate in either singler (1:1 voltage conversion) or divider (2:1 voltage conversion) mode. For example, by providing control signals that set G' and H' closed and J' and K' open, the control module 410 can configure the secondary-side circuit 450 to provide 1:1 voltage conversion. Alternatively, by providing control signals that alternate between a first switching state (G'=J'=closed; H'=K'=open), a second switching state (H'=K'=closed; G'=J'=open), with equal duration, the control module 410 can configure the secondary-side circuit 450 to provide 2:1 voltage conversion. In this mode, the two switching states noted above are toggled at a 50% duty cycle. Different switch configurations, switching schemes, and control signal configurations could be implemented to enable the secondary-side circuit 450 to provide different voltage conversion ratios.

Panel 460 depicts an example of voltage conversion through the power converter of FIG. 4. In this example, the primary-side circuit 420 can be configured to operate in either full-stack divider (2:1) or half-stack quarter-divider (4:1) mode, and the secondary-side circuit 450 can be configured to operate in either singler (1:1) or divider (2:1) mode. As a result, the two stages can be configured to provide a combined 2:1, 4:1, or 8:1 voltage conversion. In the example of FIG. 4, the resonant tank 430 and center-tapped transformer 440 provide 5:1 voltage conversion. Thus the power converter can be configured to provide a voltage conversion ratio between DC input and output voltages of 10:1, 20:1, or 40:1. As shown in panel 490, for a DC input voltage of 200 V, these conversion ratios enable the power converter of FIG. 4 to provide a DC output voltage of 20 V, 10 V, or 5 V. By implementing the primary-side circuit 420 as a stacked-bridge and the secondary-side circuit 450 as a divider/singler, the power converter of FIG. 4 can achieve the same voltage conversion ratios as the power converter of FIG. 3, but with a smaller voltage drop across the switches of the primary-side circuit. The smaller voltage drop required may allow the primary-side circuit 420 to be implementation using lower-voltage switch devices.

The primary-side circuits 320 and 420 shown in FIG. 3 and FIG. 4, respectively, are only two examples of many possible implementations of a primary-side circuit 220. A primary-side circuit 220 may include a full-bridge topology like that of circuit 320, a stacked-bridge topology like that of circuit 420, or other configurable circuit implementation.

Likewise, the secondary-side circuit 350 and 450 shown in FIG. 3 and FIG. 4 are only two examples of many possible implementations of a secondary-side circuit 250. A secondary-side circuit 250 may include a full-wave or half-wave rectifier; may incorporate any of diodes, transistors, and switching elements; may include a singler, doubler, divider, or other voltage multiplier circuit; may incorporate filters or other signal conditioning circuits; or any combination of the above.

Furthermore, the pairings of primary-side circuit 220 and secondary-side circuit 250 are not limited to those described in FIGS. 2, 3 and 4. Any primary-side circuit 220 can be paired with any secondary-side circuit 250. Similarly, any primary-side circuit 220 and secondary-side circuit 250 may be integrated with any resonant tank 230 and transformer 260 to achieve the desired voltage conversions.

Figure 5:
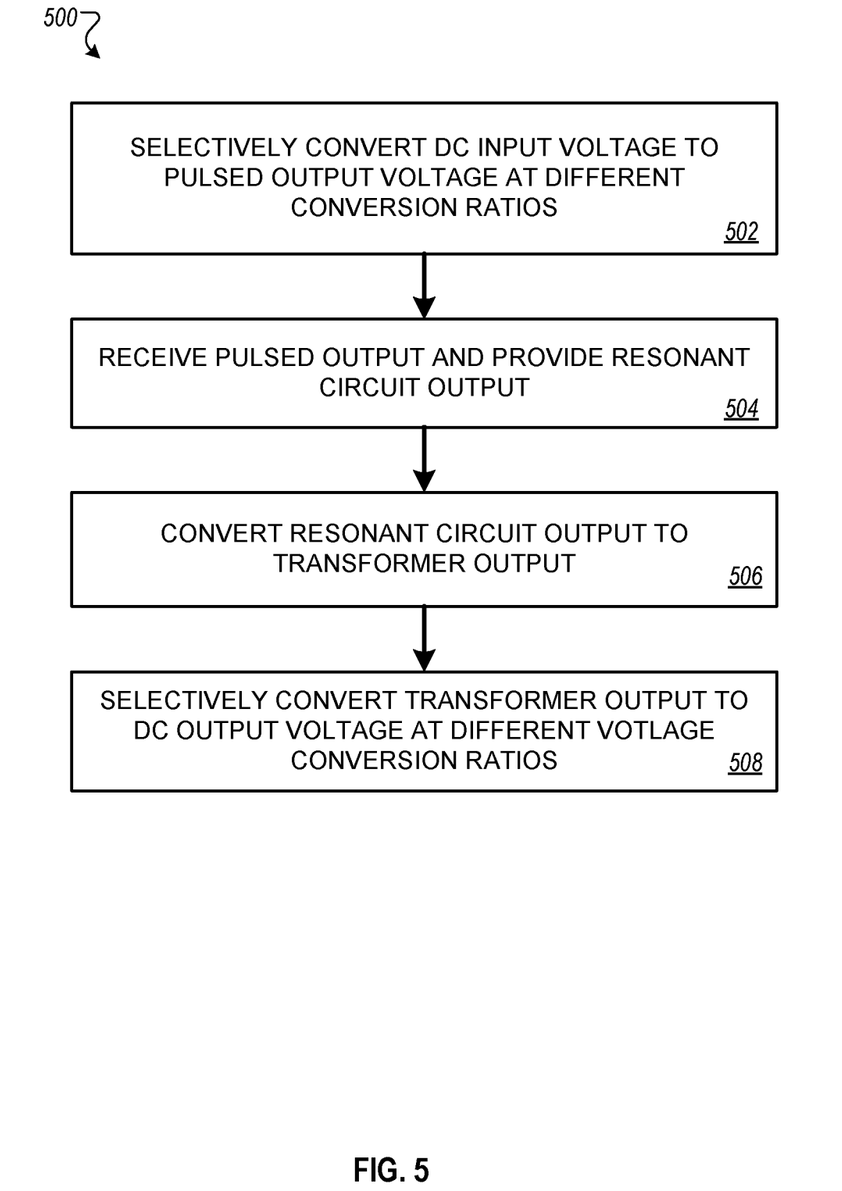
FIG. 5 is a flow chart of a method for operating a programmable power adapter.

FIG. 5 is a flow chart of a method 500 for operating a programmable power adapter. The programmable power adapter includes a power conversion circuit, which includes a first set of switches, a resonant circuit, a transformer, second set of switches, and control circuitry.

In method 500, the power conversion circuit configures the first set of switches to selectively convert a DC input voltage to a pulsed output at different voltage conversion ratios in a set of first voltage conversion ratios (502). In some implementations, the first set of switches may be selectively configured to operate in one of two modes, where the modes operate using the same fixed frequency and duty cycle but provide different voltage conversion ratios. For example, in one mode, the first set of switches may operate as a divider (2:1 voltage conversion ratio), while in a second mode, the first set of switches may operate as a singler (1:1 voltage conversion ratio).

The first set of switches may be one of various circuit topologies. For example, the first set of switches may be a bridge converter configured to operate in full bridge mode or half bridge mode according to the control signals from the control module. The first set of switches may also be a stacked bridge converter.

The resonant circuit receives the pulsed output of the switched converter and provides a resonant circuit output (504). The resonant circuit may be one of various circuit topologies. For example, the resonant circuit may be an LLC tank circuit.

The transformer converts the resonant circuit output to a transformer output at a fixed voltage conversion ratio (506).

The second set of switches selectively converts the transformer output to a DC output voltage at different voltage conversion ratios in a second set of voltage conversion ratios (508). For example, the second set of switches may be selectively configured to operate in one of two modes, where the modes operate using the same fixed frequency and duty cycle but provide different voltage conversion ratios. For example, in one mode, the second set of switches may operate as a divider (2:1 voltage conversion ratio), while in a second mode, the second set of switches may operate as a singler (1:1 voltage conversion ratio). As another example, in one mode, the first set of switches may operate as a singler (1:1 voltage conversion ratio), while in a second mode, the first set of switches may operate as a doubler (1:2 voltage conversion ratio).

The second set of switches may be one of various circuit topologies. For example, the second set of switches may include a configurable voltage doubler circuit. One implementation of a configurable doubler circuit includes two capacitors coupled in series, and two FETs coupled in series, the two FETs being coupled between a terminal of the transformer and a node between the two capacitors.

The second set of switches may also include an active or passive rectification circuit. For example, the second set of switches may include a full-bridge switching rectifier.

In method 500, the control circuitry may be configured to provide control signals that change the voltage conversion ratios of the first set of switches. For example, the control circuitry can be configured to provide control signals that cause the first set of switches to operate in one of multiple operating modes. The multiple operating mode may, for example, each correspond to a different one of the first voltage conversion ratios. These multiple operating mode of the first set of switches are capable of providing the different first voltage conversion ratios using the same switching frequency and duty cycle of the first set of switches. In some implementations, the control circuitry may vary the frequency or duty cycle of the first set of switches to induce a soft start.

The control circuitry may also be configured to provide control signals that change the voltage conversion ratios of the second set of switches. For example, the control circuitry can be configured to provide control signals that cause the second set of switches to operate in one of multiple operating modes that each correspond to a different one of the second voltage conversion ratios. These multiple operating modes of the second set of switches are capable of providing the second voltage conversion ratios at a same switching frequency and duty cycle of the second set of switches. In some implementations, the control circuitry may gradually turn on back-to-back transistors of the second set of switches, using a linear mode to limit the current for transition between operating modes of the second set of switches.

The control circuitry of the power conversion circuit may also be configured to cause the power conversion circuit to selectively vary the DC output voltage such that the voltage of the DC output is selectable from among a group of DC output voltages. For example, the power conversion circuit may select to output a first DC output voltage, a second DC output voltage that is twice the first DC output voltage, or a third DC output voltage that is four times the first DC output voltage. These DC output voltages may be selectively generated by the power conversion circuit with the first set of switches and the second set of switches both operating at the resonant frequency of the resonant circuit, such that the resonant circuit operates at unity gain. The power conversion circuit may communicate with a device over an interface to obtain information indicating the output voltage needed.

Thus, particular embodiments of the invention have been described. Other embodiments are within the scope of the following claims. For example, the actions recited in the claims may be performed in a different order and still achieve desirable results.

What is claimed is:

1. A power conversion circuit comprising:
   a first set of switches configured to selectively convert a DC input voltage to a pulsed output at different voltage conversion ratios in a set of first voltage conversion ratios;
   a resonant circuit arranged to receive the pulsed output of the switched converter and provide a resonant circuit output;
   a transformer arranged to convert the resonant circuit output to a transformer output;
   a second set of switches arranged to selectively convert the transformer output to a DC output voltage at different voltage conversion ratios in a second set of voltage conversion ratios; and
   control circuitry configured to provide control signals that change the voltage conversion ratios of the first set of switches and the second set of switches,
   wherein the control circuitry is configured to:
      provide control signals causing the first set of switches to operate in one of multiple operating modes that each correspond to a different one of the first voltage conversion ratios, wherein the multiple operating modes are respectively capable of providing the first voltage conversion ratios at a same switching frequency and duty cycle of the first set of switches;
      provide control signals causing the second set of switches to operate in one of multiple operating modes that each correspond to a different one of the second voltage conversion ratios, wherein the multiple operating modes are respectively capable of providing the second voltage conversion ratios at a same switching frequency and duty cycle of the second set of switches; and cause the power conversion circuit to selectively vary the DC output such that the voltage of the DC output is selectable from among a group including (i) a first voltage, (ii) a second voltage that is twice the first voltage, and (iii) a third voltage that is four times the first voltage, wherein the power conversion circuit is configured to selectively generate each of the first, second, or third voltages with the first set of switches and the second set of switches both operating within 30% of the resonant frequency of the resonant circuit.

2. The power conversion circuit of claim 1, wherein the first set of switches is a bridge converter configured to operate in full bridge mode or half bridge mode according to the control signals from the control module.

3. The power conversion circuit of claim 1, wherein the second voltage can be obtained by two different operating modes of the power conversion circuit.

4. The power conversion circuit of claim 1, wherein the first set of switches is a stacked bridge converter.

5. The power conversion circuit of claim 1, wherein the first set of switches is operable to convert the DC input voltage at a first voltage conversion ratio of 2:1 and a second voltage conversion ratio of 1:1 using the same frequency and duty cycle.

6. The power conversion circuit of claim 1, wherein the resonant circuit is an LLC tank circuit.

7. The power conversion circuit of claim 1, wherein the second set of switches comprises a full bridge switching rectifier.

8. The power conversion circuit of claim 1, wherein the second set of switches comprises a configurable voltage doubler circuit.

9. The power conversion circuit of claim 8, wherein the configurable voltage doubler circuit comprises two capacitors coupled in series, and two FETs coupled in series, the two FETs being coupled between a terminal of the transformer and a node between the two capacitors.

10. The power conversion circuit of claim 1, wherein the second set of switches is operable to convert the DC input voltage at a first voltage conversion ratio of 2:1 and a second voltage conversion ratio of 1:1 using the same frequency.

11. The power conversion circuit of claim 1, wherein the second set of switches is operable to convert the DC input voltage at a first voltage conversion ratio of 1:1 and a second voltage conversion ratio of 1:2 using the same frequency.

12. The power conversion circuit of claim 1, wherein the control circuitry varies frequency of the first set of switches for a soft start.

13. The power conversion circuit of claim 1, wherein the control circuitry gradually turns on back-to-back transistors of the second set of switches and uses a linear mode to limit the current for transition between operating modes of the second set of switches.

14. The power conversion circuit of claim 1, wherein the power conversion circuit communicates with a device over an interface to obtain information indicating the output voltage needed.

15. A method comprising:
operating a programmable power adapter to provide a first output voltage by:
using a first set of switches to convert a DC input voltage to a pulsed output, wherein the first set of switches is operated in an operating mode from among multiple operating modes capable of providing different voltage conversion ratios at a same switching frequency;
providing the pulsed output to a circuit comprising a resonant circuit and a transformer;
using a second set of switches to convert the transformer output to a DC output voltage, wherein the first set of switches is operated in an operating mode from among multiple operating modes capable of providing different voltage conversion ratios at a same switching frequency; and
using control circuitry of the programmable power adapter to selectively vary the DC output, wherein the voltage of the DC output is selectable from among a group including (i) a first voltage, (ii) a second voltage that is twice the first voltage, and (iii) a third voltage that is four times the first voltage, wherein the power conversion circuit is configured to selectively generate each of the first, second, or third voltages with the first set of switches and the second set of switches both operating within 30% of the resonant frequency of the resonant circuit.

16. The method of claim 15, further comprising:
after operating a programmable power adapter to provide a first output voltage, operating the programmable power adapter to provide a second output voltage by changing the operating mode of the first set of switches or the second set of switches.

17. The method of claim 16, further comprising gradually transitioning between the operating modes used to generate the first voltage output and operating modes used to generate the second voltage output.

18. The method of claim 15, wherein the first set of switches is capable of operating in each of a set of operating modes comprising two or more of a voltage divider mode, a voltage singler mode, and a voltage doubler mode; and
wherein the first set of switches is capable of operating in each of a set of operating modes comprising two or more of a voltage divider mode, a voltage singler mode, and a voltage doubler mode.

19. The method of claim 15, further comprising:
receiving, by the programmable power adapter, data indicating a particular output voltage of a device connected to the programmable power adapter; and
based on the received data, generating control signals to operate the first set of switches and the second set of switches at operating modes selected to for generating the particular output voltage.

* * * * *